(12) United States Patent
Park et al.

(10) Patent No.: US 12,409,724 B2
(45) Date of Patent: Sep. 9, 2025

(54) AIR FLAP HAVING MIXED-TYPE DOOR STRUCTURE

(71) Applicant: Hanon Systems, Daejeon (KR)

(72) Inventors: Sung-Wook Park, Daejeon (KR); Ok Ryul Min, Daejeon (KR); Won Sub So, Daejeon (KR); Yong Min Jo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 567 days.

(21) Appl. No.: 17/800,046

(22) PCT Filed: Feb. 16, 2021

(86) PCT No.: PCT/KR2021/001973
§ 371 (c)(1),
(2) Date: Aug. 16, 2022

(87) PCT Pub. No.: WO2021/167323
PCT Pub. Date: Aug. 26, 2021

(65) Prior Publication Data
US 2023/0084648 A1    Mar. 16, 2023

(30) Foreign Application Priority Data

Feb. 19, 2020  (KR) ........................ 10-2020-0020267
Feb. 15, 2021  (KR) ........................ 10-2021-0020034

(51) Int. Cl.
*B60K 11/08* (2006.01)
*B60K 11/04* (2006.01)
*B62D 25/08* (2006.01)

(52) U.S. Cl.
CPC ............ *B60K 11/085* (2013.01); *B60K 11/04* (2013.01); *B62D 25/084* (2013.01)

(58) Field of Classification Search
CPC ........ B60K 11/085; B60K 11/04; B62D 25/08
See application file for complete search history.

(56) References Cited

U.S. PATENT DOCUMENTS 8,473,164 B2 * 6/2013 Charnesky ........... B60K 11/085
                                                    123/41.04
9,902,256 B2 * 2/2018 Yamamoto ............. B60K 11/04
(Continued)

FOREIGN PATENT DOCUMENTS

DE    102015209523 A1 * 11/2016
DE    102018124572 A1 *  4/2020
(Continued)

OTHER PUBLICATIONS

Official Action issued Dec. 27, 2024 in related Korean Patent Application No. KR 10-2021-0020034, 8 pgs.

*Primary Examiner* — Steve Clemmons
(74) *Attorney, Agent, or Firm* — NORTON ROSE FULBRIGHT US LLP

(57) ABSTRACT

The present invention relates to an air flap having a mixed-type door structure. The objective of the present invention is to provide an air flap having a mixed-type door structure. In terms of a door structure of an external air flap provided matching a bumper cover, an upper door, for which it is difficult to secure an upper operation space, is formed in a planar shape, whereas a lower door is formed in a cylindrical shape in the same manner as a door of a general external air flap, such that, on the whole, the air flap has a mixed-type door structure.

11 Claims, 6 Drawing Sheets

(56) References Cited

U.S. PATENT DOCUMENTS

| | | | | |
|---|---|---|---|---|
| 10,166,858 B2 * | 1/2019 | Ibañez | ................... | F16H 37/12 |
| 10,421,352 B2 * | 9/2019 | Urbach | ................ | B60K 11/085 |
| 10,604,004 B2 * | 3/2020 | Fujitani | ................... | B60R 19/52 |
| 10,821,826 B2 * | 11/2020 | Stenger | ................ | B60K 11/085 |
| 11,225,135 B2 * | 1/2022 | Kim | ..................... | B60K 11/085 |
| 11,560,048 B2 * | 1/2023 | Kim | ..................... | B60K 11/085 |
| 12,151,549 B2 * | 11/2024 | Hafner | ................ | B60K 11/085 |
| 2011/0005851 A1 * | 1/2011 | Doroghazi | .......... | B60R 13/0838 |
| | | | | 29/897.15 |
| 2011/0251761 A1 * | 10/2011 | Charnesky | ........... | B60K 11/085 |
| | | | | 701/49 |
| 2016/0207394 A1 | 7/2016 | Vacca et al. | | |
| 2017/0072784 A1 * | 3/2017 | Yoo | ..................... | B60K 11/085 |
| 2018/0194190 A1 * | 7/2018 | Kim | ......................... | B60H 1/22 |
| 2018/0281561 A1 * | 10/2018 | Nolta | ................ | B60H 1/00842 |

FOREIGN PATENT DOCUMENTS

| | | | | |
|---|---|---|---|---|
| JP | 5620085 B2 | 11/2014 | | |
| KR | 20110109034 A | 10/2011 | | |
| KR | 20120106034 A | 9/2012 | | |
| KR | 20120113956 A | * 10/2012 | | |
| KR | 20140032620 A | 3/2014 | | |
| KR | 101575255 B1 | 12/2015 | | |
| KR | 101714220 B1 | 3/2017 | | |
| WO | WO-2006066680 A1 * | 6/2006 | ........... | B60K 11/085 |

* cited by examiner

PLANAR DOOR

CYLINDRICAL DOOR

AIR FLAP HAVING MIXED-TYPE DOOR STRUCTURE

CROSS REFERENCE TO RELATED APPLICATIONS

This application is a national phase under 35 U.S.C. § 371 of International Application No. PCT/KR2021/001973 filed on Feb. 16, 2021, which claims benefit of priority from Korean Patent Application Nos. 10-2021-0020034 filed on Feb. 15, 2021 and 10-2020-0020267 filed on Feb. 19, 2020. The entire contents of these applications are incorporated herein by reference in their entirety.

TECHNICAL FIELD

The present invention relates to an air flap having a mixed-type door structure, and more particularly, to an air flap having a mixed-type door structure that makes an operation of the air flap smoother by improving a structure of an external air flap provided to match a bumper cover.

BACKGROUND ART

In general, an engine room of a vehicle is provided with not only components for driving, such as an engine, but also various heat exchangers for cooling respective components in the vehicle, such as the engine or adjusting an air temperature of the interior of the vehicle. External air should be smoothly supplied into the engine room of the vehicle in order for the various heat exchangers in the engine room of the vehicle to stably operate. In order to smoothly supply the external air to the heat exchangers in the engine room of the vehicle as described above, a grille in which a plurality of holes are formed is generally provided on a front side of the vehicle. That is, a driving wind introduced through the grille when the vehicle is driven passes through a cooling module including the heat exchangers to enable smooth heat exchange.

However, these is a case where the introduction of the air is helpful and sometimes has a negative effect depending on a state, a driving speed, or the like, of the vehicle, and thus, it is necessary to allow the driving wind to be supplied only when necessary. Accordingly, in recent vehicles, an active air-flap is generally provided in a duct formed between the grille of the vehicle and the cooling module. The active air flap has a shape in which it may be opened and closed, such that it is closed when necessary (when the vehicle is initially started or is driven at a high speed) to prevent the introduction of the air, and guides the air introduced through the grills to the heat exchanger to enable smooth heat exchange when it is opened. Basically, such an air flap is formed to be assembled on an upper portion or a lower portion of a carrier of a front end module to control a flow of the air. An opening corresponding to the cooling module is formed in the carrier so that the air is smoothly blown to the cooling module, and a radiator of the cooling module is generally disposed at a position of the opening. The air flap is configured to include a plurality of doors, which are formed to be opened when the air is to be blown to the radiator and be closed when the air is to be blocked. Meanwhile, there are various types of air flaps, which are classified into internal air flaps and external air fraps according to shapes in which they are provided.

The internal air flap is called an internal air flap because the doors are directly provided on the duct guiding the air to the cooling module and a door driving structure is also formed to be fixed to the duct, and is configured to match a shape of an opening of a cooling module carrier. A structure of the internal air flap is determined according to a size or the shape of the opening, and most of the doors formed in the internal air flap have a planar shape (shape in which rotation shafts are formed in the doors itself). A general structure of the internal air flap has been well disclosed in Korean Patent Laid-Open Publication No. 10-2014-0032620 (entitled "Smart Active Air Flap for Vehicle and Method for Controlling the same" and published on Mar. 17, 2014) and the like.

The external air flap is called an external air flap because a driving structure is not fixed onto a duct, but is formed integrally with a grille, and is configured to match a shape of a bumper cover. That is, the external air flap is included in a bumper assembly such as the grille, the bumper cover, and a bumper beam. As described above, due to a difference in assembly position between the external air flap and the internal air flap, in many cases, the external air flap has a structure partially different from that of the internal air flap. For example, unlike the internal air flap, in the external air flap, the doors have a cylindrical shape in which rotation shafts are formed outside the doors) A general structure of an external air flap has been well disclosed in Korean Patent Laid-Open Publication No. 10-2012-0113956 (entitled "Radiator Grille Comprising Air Flap" and published on Oct. 16, 2012) and the like.

In the past, the internal air flap was widely used, but recently, an application range of the external air flap has increased due to a change in a space design of the engine room. In this case, as described above, the external air flap is different in the assembly position from the internal air flap, and thus, has many structural differences from the internal air flap. Since the internal air flap is fixedly coupled onto the duct, it is relatively easy to dispose the driving structure in a left and right direction. On the other hand, since the internal air flap is formed integrally with the grille, a space enough to dispose the driving structure in the driving space in the left and right direction does not remain in many cases.

A planar door having a rotation shaft formed on itself is easily designed and installed due to an intuitive and simple structure, while the rotation shaft protruding from left and right sides of the door and a structure for driving the rotation shaft should be disposed, and thus, a considerable space is necessary in the left and right direction. However, since the external air flap is formed in a shape in which it matches the bumper cover, it is quite difficult to secure such a space for installing the driving structure in the left and right direction. For this reason, a cylindrical door, that is, a door having a shape in which the rotation shaft is formed outside the door, is generally applied to the external air flap. FIG. 1 is a view illustrating schematic structures of a planar door and a cylindrical door, structures and operation forms of two types of doors may be easily understood through FIG. 1.

Meanwhile, the internal air flap includes three or more doors in many cases, while the external air flap includes only two doors formed at upper and lower sides, and in particular, an upper door is formed to have a small width and a lower door is formed to have a great width in many cases. A side view and an operation form of an external air flap according to the related art manufactured to meet these manufacturing requirements are illustrated in FIG. 2. As well illustrated in FIG. 2, when the external air flap is closed, both the doors are disposed forward, and when the external air flap is opened, the doors are configured to rotate upward.

A lower door has a considerable spatial margin such as a space in which an upper door is disposed on the upper side thereof, and thus, does not have a great difficulty in securing an operation space. However, the upper door has a difficulty in securing a free space on the upper side thereof due to a limitation caused by a position of the external air flap itself, and accordingly, has a considerable difficulty in making a design to secure an appropriate operation space.

Furthermore, in the related art, since an operation space is formed on the upper side of the upper door, when the external air flap is closed, the operation space is in an open state, such that the driving wind may not be completely blocked and the air leaks. As described above, the air flap is a device for improving performance of the cooling module by preventing the driving wind from being supplied to the cooling module, and thus, such air leakage causes deterioration of the performance of the cooling module itself.

RELATED ART DOCUMENT

Patent Document (Patent Document 1) 1. Korean Patent Laid-Open Publication No. 10-2014-0032620 (entitled "Smart Active Air Flap for Vehicle and Method for Controlling the same" and published on Mar. 17, 2014)

(Patent Document 2) 2. Korean Patent Laid-Open Publication No. 10-2012-0113956 (entitled "Radiator Grille Comprising Air Flap" and published on Oct. 16, 2012)

DISCLOSURE

Technical Problem

An object of the present invention is to provide an air flap having a mixed-type door structure that makes an operation of the air flap smoother by improving a structure of an external air flap provided to match a bumper cover. In more detail, an object of the present invention is to provide an air flap having a mixed-type door structure that is formed in a mixed type as a whole by forming an upper door having a difficulty in securing an upper operation space in a planar shape and forming a lower door in a cylindrical shape as in a general external air flap.

Technical Solution

In one general aspect, an air flap 100 having a mixed-type door structure is an air flap 100 assembled to a grille of a vehicle and includes: a first door 110 in which a rotation shaft is formed inside a door plane extending in an up and down direction and a left and right direction when the air flap is closed; a second door 120 in which a rotation shaft is formed outside a door plane extending in an up and down direction and a left and right direction when the air flap is closed; and a housing 150 including a first opening 151 opened and closed by the first door 110 so that air blowing is controlled in a front and rear direction and a second opening 152 opened and closed by the second door 120 so that air blowing is controlled in the front and rear direction, wherein the first opening 110 and the second opening 120 are formed to have different sizes.

In this case, the first door 110 may be disposed on an upper side, and the second door 120 may be disposed on a lower side.

More specifically, the first door 110 may be formed to rotate around first rotation points 111 formed at ends of left and right sides thereof, and the second door 120 may include second rotation arms 122 formed to extend in the front and rear direction when the air flap is closed, at ends of left and right sides thereof, and be formed to rotate around second rotation points 121 formed at ends of the second rotation arms 121.

In addition, a length of the first opening 151 in the left and right direction may be formed to be smaller than a length of the second opening 152 in the left and right direction.

In this case, the end of the left side of the first door 110 may be formed to be spaced apart from a first rotation point 111a of the left side or the end of the right side of the first door 110 may be formed to be spaced apart from a first rotation point 111b of the right side, by a difference in length in the left and right direction between the first opening 151 and the second opening 152, and the end formed to be spaced apart from the first rotation point 111 and the first rotation point 111 corresponding to the end may be connected to each other by a first rotation shaft 112 extending in the left and right direction.

In addition, in the first door 110, a driving part may be connected to the first rotation shaft 112, and the first rotation point 111 on an opposite side of the first rotation shaft 112 may be coupled to the housing 150 by a rotatable coupling hole.

In addition, a length of the first opening in the up and down direction may be formed to be smaller than a length of the second opening in the up and down direction.

In this case, the second door 120 may have narrow surface part 125 formed at a portion of the end of the left side or the right side thereof and having a length in the up and down direction smaller than that of the other portions.

In addition, in the second door 120, a length, in the left and right direction, of portions other than the narrow surface part 125 may be formed to be greater than the length of the first opening 151 in the left and the right direction.

In addition, in the second door 120, a driving part may be connected to the second rotation point 121 on the narrow surface part 125 side, and the second rotation point 121 on an opposite side to the narrow surface part 125 may be coupled to the housing 150 by the rotatable coupling hole.

In addition, in the second door 120, a direction in which the first rotation shaft 112 is formed and a direction in which the narrow surface part 125 is formed may be formed to be the same as each other.

In addition, the air flap may be formed in a shape in which a pair of unit assemblies each including the first door 110, the second door 120, and the housing 150 are disposed in parallel in the left and right direction.

In addition, the pair of the unit assemblies may be formed in a symmetrical shape in the left and right direction.

In addition, driving parts driven so that the first door 110 and the second door 120 are opened and closed may be formed at left and right ends and be connected to the first door 110 and the second door 120, and opposite sides to the driving parts of the first door 110 and the second door 120 may be coupled to the housing 150 by rotatable coupling holes.

Advantageous Effects

According to the present invention, there is an effect of making an operation of an air flap more smooth by improving a structure of an external air flap provided to match a bumper cover. Specifically, in an air flap according to the present invention, an upper door in which it is difficult to secure an upper operation space is formed in a planar shape, while a lower door is formed in a cylindrical shape as in a general external air flap, such that the air flap is formed in a mixed type as a whole. Accordingly, a separate operation space is not necessary on an upper side of the upper door, and thus, there is an effect of enabling a disposition and an operation of the external air flap to be performed much more smoothly than in the related art.

In addition, according to the present invention, a separate operation space is not formed on the upper side of the upper door, and thus, there is an effect to fundamentally solving a problem of air leakage through an upper operation space of the upper door in the related art. Accordingly, according to the present invention, there is an effect of preventing deterioration of performance of a cooling module due to the air leakage, and consequently improving the performance of the cooling module.

[Detailed Description of Main Elements]

| | |
|---|---|
| 100: air flap | |
| 110: first door | |
| 111: first rotation point | 112: first rotation shaft |
| 111a: first rotation point of left | 111b: first rotation point of right side |
| 120: second door | |
| 121: second rotation point | 122: second rotation arm |
| 125: narrow surface part | |
| 150: housing | 155: blocking part |

BEST MODE

Hereinafter, an air flap having a mixed-type door structure according to the present invention having the configuration as described above will be described in detail with reference to the accompanying drawings.

Figure 3:
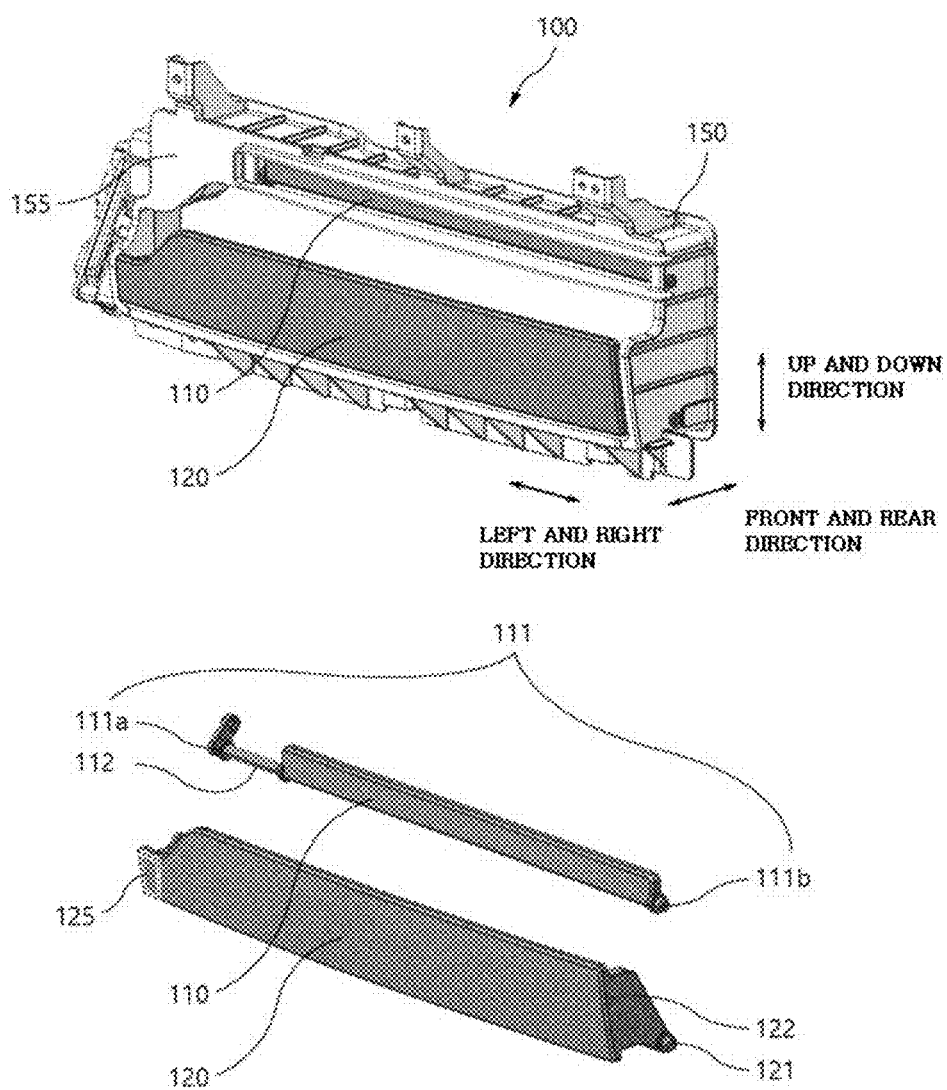
FIG. 3 is a perspective view of an external air flap according to the present invention at the time of being closed.
Figure 4:
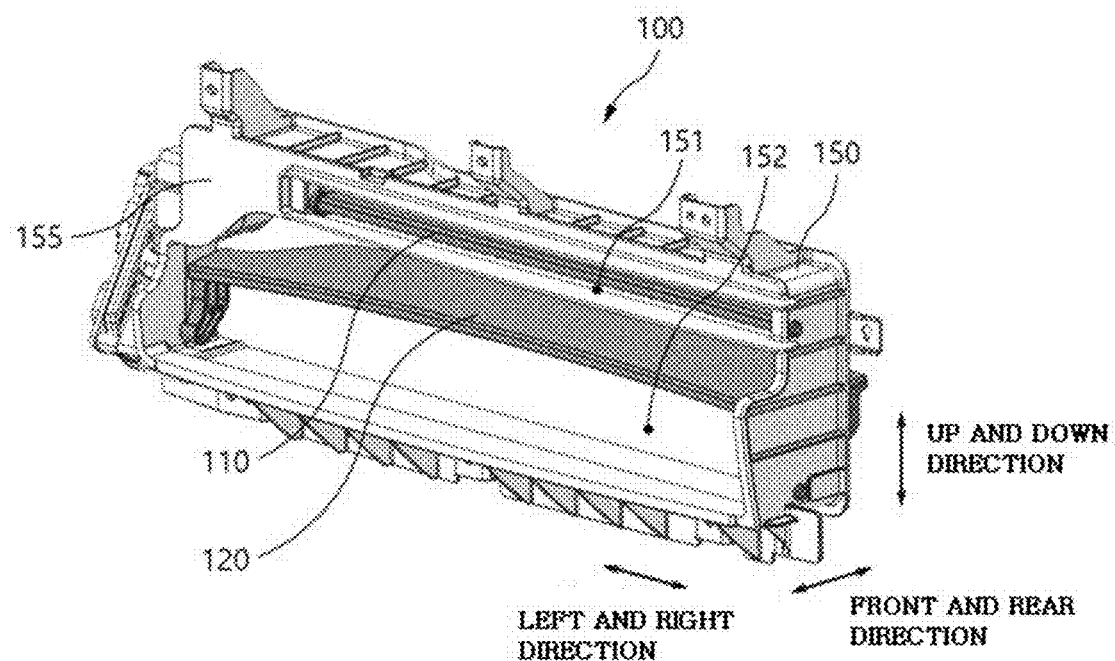
FIG. 4 is a perspective view of the external air flap according to the present invention at the time of being opened.
Figure 4:
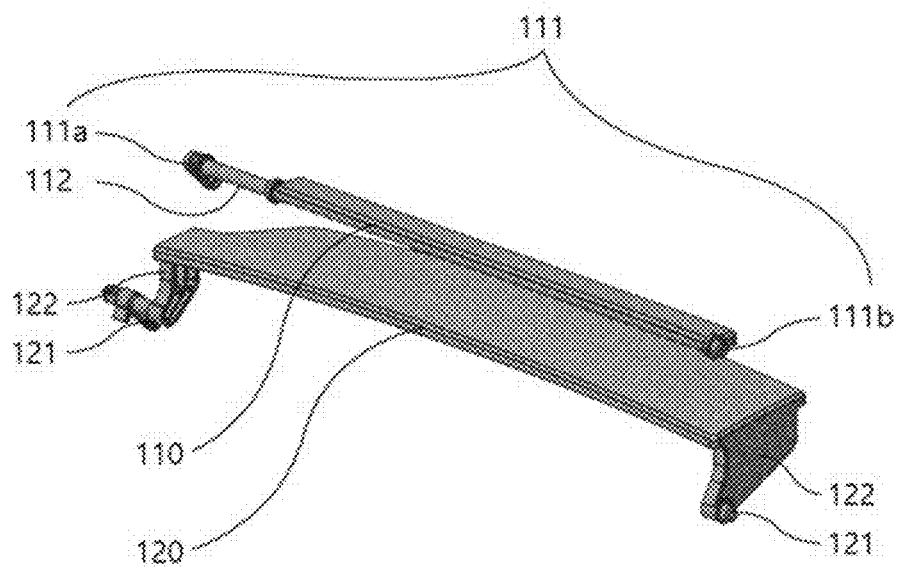

FIG. 3 is a perspective view of an external air flap according to the present invention at the time of being closed, and FIG. 4 is a perspective view of the external air flap according to the present invention at the time of being opened. An air flap 100 according to the present invention is the external air flap assembled to the grille of the vehicle as described above. Like a general external air flap, the air flap 100 according to the present invention also includes two doors, that is, a first door 110 and a second door 120, disposed in an up and down direction. In addition, the air flap 100 naturally includes a housing 150 supporting the first door 110 and the second door 120 and including openings opened and closed by the first door 110 and the second door 120. A first opening 151 and a second opening 152 opened and closed by the first door 110 and the second door 120, respectively, are formed in the housing 150.

Figure 1:
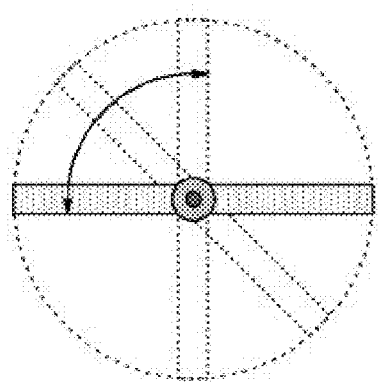
FIG. 1 is a view illustrating schematic structures of a planar door and a cylindrical door.
Figure 1:
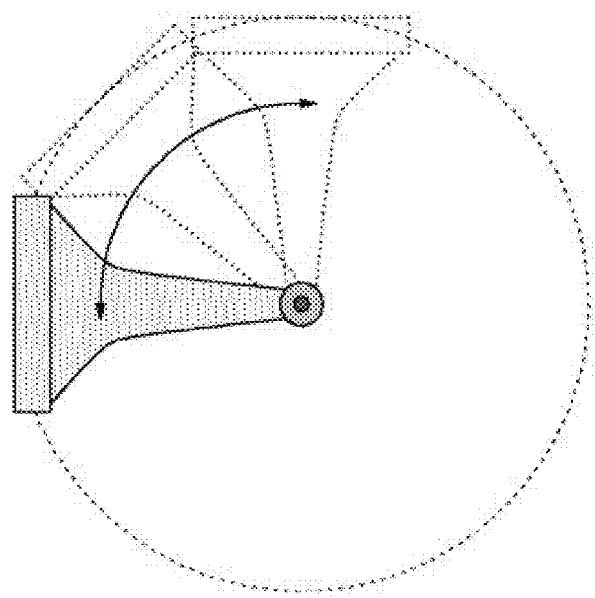
Figure 2:
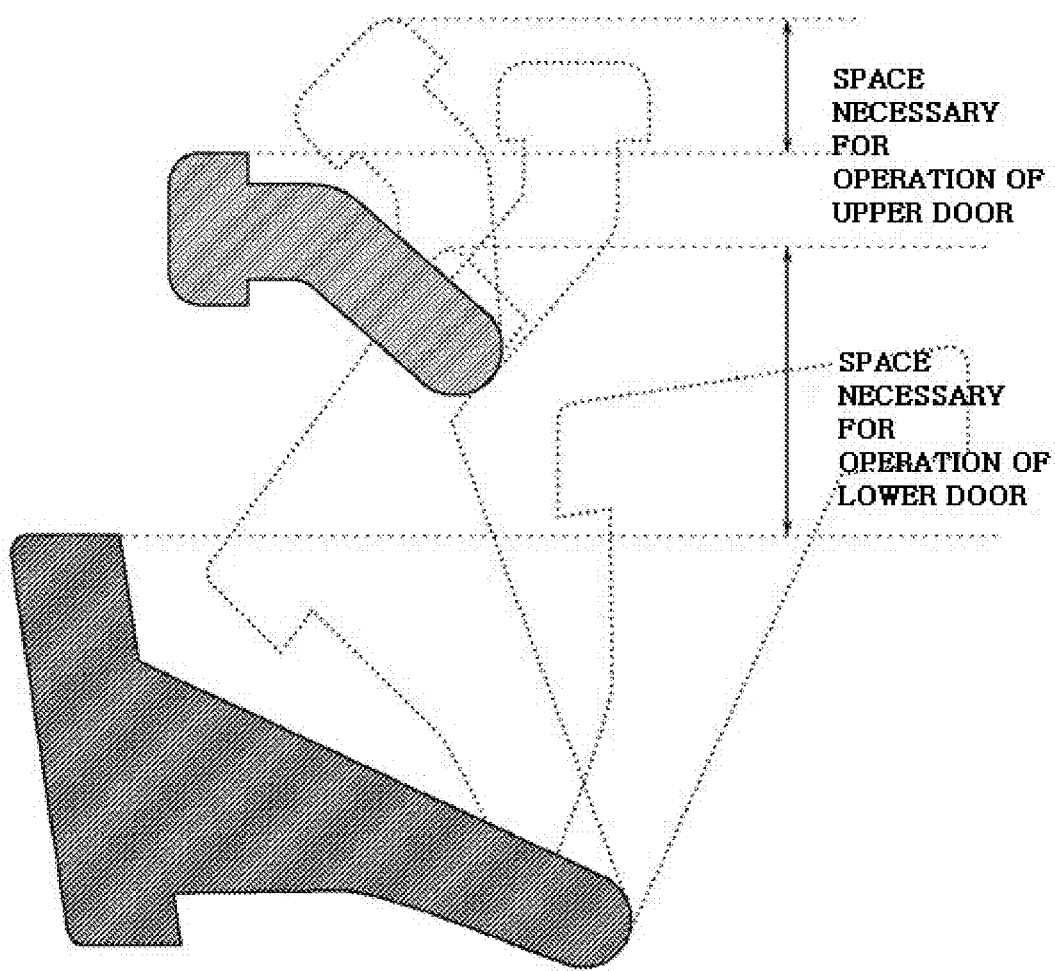
FIG. 2 is a side view illustrating operation form of an external air flap according to the related art.
Figure 5:
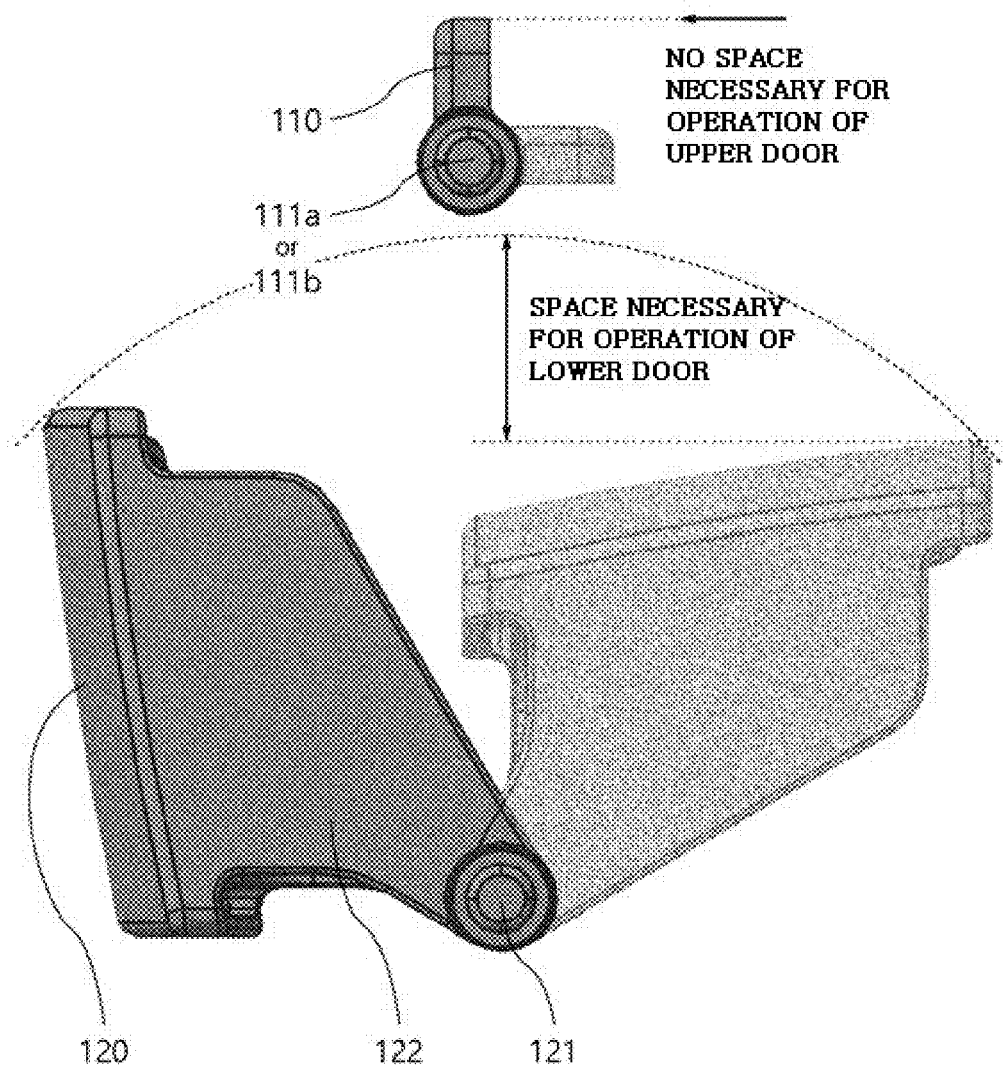
FIG. 5 is a side view illustrating operation form of the external air flap according to the present invention.

In this case, in a case of the air flap 100 according to the present invention, unlike an external air flap according to the related art in which both of upper and lower doors are formed in a cylindrical shape as illustrated in FIG. 2, the first door 110 is disposed on the upper side and is formed in a planar shape, while the second door 120 is disposed on the lower side and is formed in a cylindrical shape. Accordingly, in the present invention, the first opening 110 and the second opening 120 are formed to have different sizes. FIG. 5 is a side view illustrating operation form of the external air flap according to the present invention. When comparing FIG. 5 with FIG. 2, even in the present invention, the second door 120 is formed in the cylindrical shape, and thus, there is still a space necessary for an operation, but the first door 110 is formed in the planar shape, and thus, a separate space necessary for an operation is not generated.

As described above, the external air flap is generally formed integrally with the grille, and accordingly, other structures exist on the upper side, such it is difficult to secure a large free space on the upper side. In many case, since the first door 110 is disposed on the upper side of the second door 120, it is possible to secure a free space on the upper side of the second door 120 as compared with the first door 110, such that it is easy to form a space necessary for an operation in the second door 120, but there is no free space on the upper side of the first door 110, such it is difficult to form a space necessary for an operation in the first door 110.

However, according to the present invention, as illustrated in FIG. 5, the first door 110 is formed in the planar shape, and thus, a separate space necessary for an operation is not necessary on the upper side of the first door 110 at all. Therefore, unlike the related art, a disposition design of the first door 110 becomes much easier. In particular, there is no need to form a surplus space wasted without any role other than a role of the space necessary for an operation in order to form the space necessary for an operation of the first door 110, and as a result, the overall space utilization of the vehicle may be improved.

Hereinafter, a more detailed and specific configuration of the air flap 100 will be described in more detail. First, it has been briefly described that the doors 110 and 120 have the planar shape and the cylindrical shape, respectively, but configurations of the doors 110 and 120 will be clearly described.

It has been described that the first door 110 is formed in the planar shape, which refers to a shape in which a rotation shaft is formed inside a door plane. In the present invention, the door plane of the first door 110 is formed to extend in the up and down direction and a left and right direction when the air flap is closed, and the first opening 151 formed on the housing 150 is opened and closed by the first door 110 so that air blowing is controlled in a front and rear direction. The first door 110 includes first rotation points 111 formed at ends of the left and right sides thereof, and rotates around the first rotation points 111. A straight line connecting the first rotation points 111 to each other becomes a rotation shaft of the first door 110, and in such a manner, the first door 110 has a planar shape in which the rotation shaft is formed inside the door plane.

It has been described that the second door 120 is formed in the cylindrical shape, which refers to a shape in which a rotation shaft is formed outside a door plane. In the present invention, the door plane of the second door 120 is formed to extend in the up and down direction and the left and right direction when the air flap is closed, and the second opening 152 formed on the housing 150 is opened and closed by the second door 120 so that air blowing is controlled in the front and rear direction. The second door 120 includes second rotation arms 122 are formed to extend in the front and rear direction (when the external air flap is closed in FIG. 3) at ends of the left and right sides thereof. In this case, in the second door 120, second rotation points 121 are formed at ends of the second rotation arms 122 (more specifically, ends of the second rotation arms 120 on sides that are not connected to the second door 120), and the second door 120 rotates around the second rotation points 121. A straight line connecting the second rotation points 121 to each other becomes a rotation shaft of the second door 120, and in such a manner, the second door 120 has a cylindrical shape in which the rotation shaft is formed outside the door plane.

Meanwhile, it has been described above that in a case of the planar door, the free space is necessary in the left and right direction in order to form the driving structure. In a case of the present invention, since the planar door and the cylindrical door are mixed and disposed, it may be difficult to properly dispose the driving structure when the free space in the left and right direction is formed for each of the planar door and the cylindrical door. In consideration of this point, in the air flap 100, it is preferable that a length of the first opening 151 in the left and right direction is formed to be smaller than a length of the second opening 152 in the left and right direction. That is, in this case, the length of the first door 110 (standard of the first door 110 in the left right direction in FIGS. 3 and 4) is formed to be smaller than the length of the second door 120.

In this case, a configuration of the first door 110 will be described in more detail below. In this case, the first door 110 is configured so that the end of the left side thereof is formed to be spaced apart from a first rotation point 111a of the left side or the end of the right side thereof is formed to be spaced apart from a first rotation point 111b of the right side, by a difference in length in the left and right direction between the first opening 151 and the second opening 152. FIG. 3 illustrates an example in which the end of the left side of the first door 110 is spaced apart from the first rotation point 111a of the left side, but this may be modified according to a shape design of the vehicle. In this case, the end formed to be spaced apart from the first rotation point 111 and the first rotation point 111 corresponding to the end are connected to each other by a first rotation shaft 112 extending in the left and right direction, as illustrated in FIGS. 3 and 4. In addition, a length of the first rotation shaft 112 may be appropriately determined depending on a volume of the driving structure of the first door 110.

As described above, the first rotation shaft 112 is to be connected to the driving structure. That is, the first door 110 is formed so that a driving part thereof is connected to the first rotation shaft 112. Meanwhile, the first rotation point 111 on an opposite side of the first rotation shaft 112 is coupled to the housing 150 by a rotatable coupling hole, such that the first door 110 may smoothly perform a rotation motion without being twisted or deviated from its original position.

However, when the first door 110 is formed to be smaller than the second door 120 as described above, if lengths, in the up and down direction, of the openings formed in the housing 150 are formed to be the same as each other, there is a risk that air will leak through a region where a difference in length is generated. In order to prevent such a problem, it is preferable that the housing 150 has a blocking part 155 formed to block air flow at a position at which the first rotation shaft 112 is disposed. FIGS. 3 and 4 illustrate an example in which the opening includes a first opening 151 opened and closed by the first door 110 and a second opening 152 opened and closed by the second door 120. In this case, the first opening 151 is formed to have a length corresponding to that of the first door 110, and accordingly, the blocking part 155 blocking the air flow is naturally formed in a region in which a difference in length between the first opening 151 and the second opening 152 is generated.

Meanwhile, in general, in the external air flap, an upper door has a width (standard in the up and down direction (when the external air flap is closed in FIG. 3) smaller than that of a lower door. Similarly in the present invention, it is preferable that a length of the first opening 151 in the up and down direction is formed to be smaller than a length of the second opening 152 in the up and down direction to secure compatibility with an existing external air flap.

In this case, it is preferable that the second door 120 has a narrow surface part 125 formed at a portion of the end of the left side or the right side thereof and having a length in the up and down direction smaller than that of the other portions. More specifically, it is preferable that a length, in the left and right direction, of portions other than the narrow surface part 125 is formed to be greater than the length of the first opening 151 in the left and the right direction. In the above description of a specific shape of the first door 110, it has been described that the first rotation shaft 112 is formed on one side of the first door 110 in the left and right direction is be connected to the driving part. Since the door plane is not formed in a portion corresponding to the first rotation shaft 112, the control of the air blowing by the opening and closing of the door is not naturally performed, the blocking part 155 is formed so that air is introduced into such a portion. Since the driving part drives the first door 110 and the second door 120 together with each other, in this case, it is preferable that the second door 120 is also connected to the driving part on the same side as a side on which the first door 110 is connected to the driving part. That is, in the second door 120, the driving part is connected to the second rotation point 121 on the narrow surface part 125 side, the second rotation point 121 on an opposite side to the narrow surface part 125 is coupled to the housing 150 by the rotatable coupling hole, and a direction in which the first rotation shaft 112 is formed and a direction in which the narrow surface part 125 is formed are formed to be the same as each other. The first door 110 and the second door 120 have a difference in length in the left and right direction therebetween, and a sudden change in the difference in the length occurs in a portion where the difference in the length exists. However, when the second door 120 is formed in the shape as described above, a change in the difference in the length in the left and right direction between the first door 110 and the second door 120 may be further alleviated, and accordingly, instability of an air flow may be further suppressed. In this case, the blocking part 155 may be formed to further extend toward the second door 120 so as to correspond to a shape of the narrow surface part 125.

Figure 6:
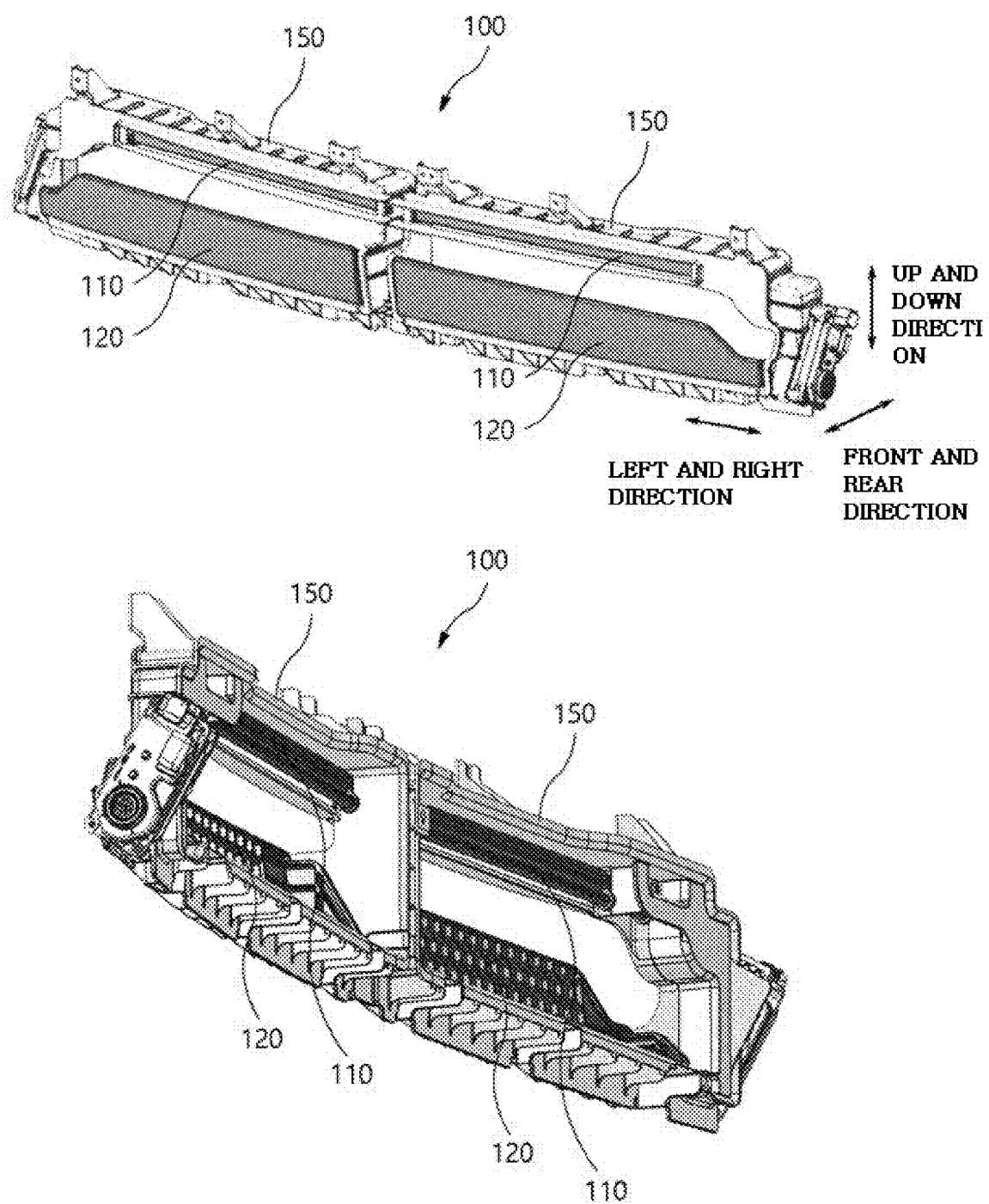
FIG. 6 is a view illustrating an embodiment of the external air flap according to the present invention.

FIG. 6 is a view illustrating an embodiment of the external air flap according to the present invention. In an embodiment of FIG. 6, the air flap 100 is formed in a shape in which a pair of unit assemblies each including the first door 110, the second door 120, and the housing 150 are disposed in parallel in the left and right direction. A perspective view viewed from the front side is illustrated on the upper side of FIG. 6, and a perspective view viewed from the rear side is illustrated on the lower side of FIG. 6.

The air flap 100 described above with reference to FIGS. 3 to 5 is formed of only one unit assembly. That is, the air flap of an embodiment of FIG. 6 is considered to have a shape in which two air flaps according to an embodiment of FIGS. 3 to 5 are disposed in parallel in the left and right direction. In this case, as illustrated in FIG. 6, the pair of the unit assemblies are formed in a symmetrical shape in the left and right direction. That is, in the above description, a portion where the first door 110 is formed to be short and the first rotation shaft 112 is formed accordingly, a portion where the narrow surface portion 125 is formed in the second door 120, and the like, are formed to be symmetric to each other in the left and right direction in the pair of unit assemblies.

When the pair of unit assemblies are disposed to be symmetrical to each other in the left and right direction, the driving part opening and closing the doors may be formed at the center or the driving parts may be formed at left and right ends. When the driving part is formed at the center, there is an advantage that it is sufficient that only one driving part is formed, but a significant loss occurs in an air volume by a volume occupied by the driving part in blowing air blown from the front, and thus, it is not preferable that the driving part is formed at the center. Accordingly, in the air flap 100, as illustrated in FIG. 6, it is preferable that the driving parts driven so that the first door 110 and the second door 120 are opened and closed are formed at the left and right ends and are connected to the first door 110 and the second door 120. In this case, opposite sides to the driving parts of the first door 110 and the second door 120 are formed to be coupled to the housing 150 by rotatable coupling holes.

The present invention is not limited to the embodiments described above, and may be applied to various fields. In addition, the present invention may be variously modified by those skilled in the art to which the present invention pertains without departing from the gist of the present invention claimed in the claims.

INDUSTRIAL APPLICABILITY

In an air flap according to the present invention, an upper door in which it is difficult to secure an upper operation space is formed in a planar shape, while a lower door is formed in a cylindrical shape as in a general external air flap, such that the air flap is formed in a mixed type. Accordingly, a separate operation space is not necessary on an upper side of the upper door, and thus, there is an effect of enabling a disposition and an operation of the external air flap to be performed much more smoothly than in the related art. Accordingly, according to the present invention, there is an effect of preventing deterioration of performance of a cooling module due to the air leakage, and consequently improving the performance of the cooling module.

The invention claimed is:

1. An air flap assembled to a grille of a vehicle, comprising:
a first door in which a rotation shaft is formed inside a door plane extending in an up and down direction and a left and right direction when the air flap is closed;
a second door in which a rotation shaft is formed outside a door plane extending in an up and down direction and a left and right direction when the air flap is closed; and
a housing including a first opening opened and closed by the first door so that air blowing is controlled in a front and rear direction and a second opening opened and closed by the second door so that air blowing is controlled in the front and rear direction,
wherein the first opening and the second opening are formed to have different sizes,
wherein the first door is formed to rotate around first rotation points formed at ends of left and right sides thereof, and
wherein the second door includes second rotation arms formed to extend in the front and rear direction when the air flap is closed, at ends of left and right sides thereof, and is formed to rotate around second rotation points formed at ends of the second rotation arms,
wherein a length of the first opening in the left and right direction is formed to be smaller than a length of the second opening in the left and right direction,
wherein the end of the left side of the first door is formed to be spaced apart from a first rotation point of the left side or the end of the right side of the first door is formed to be spaced apart from a first rotation point of the right side, by a difference in length in the left and right direction between the first opening and the second opening, and
wherein the end formed to be spaced apart from the first rotation point and the first rotation point corresponding to the end are connected to each other by a first rotation shaft extending in the left and right direction.

2. The air flap of claim 1, wherein the first door is disposed on an upper side, and the second door is disposed on a lower side.

3. The air flap of claim 1, wherein in the first door,
a driving part is connected to the first rotation shaft, and
the first rotation point on an opposite side of the first rotation shaft is coupled to the housing by a rotatable coupling hole.

4. The air flap of claim 1, wherein a length of the first opening in the up and down direction is formed to be smaller than a length of the second opening in the up and down direction.

5. The air flap of claim 4, wherein the second door has a narrow surface part formed at a portion of the end of the left side or the right side thereof and having a length in the up and down direction smaller than that of the other portions.

6. The air flap of claim 5, wherein in the second door, a length, in the left and right direction, of portions other than the narrow surface part is formed to be greater than the length of the first opening in the left and the right direction.

7. The air flap of claim 5, wherein in the second door,
a driving part is connected to the second rotation point on the narrow surface part side, and
the second rotation point on an opposite side to the narrow surface part is coupled to the housing by the rotatable coupling hole.

8. The air flap of claim 5, wherein in the second door, a direction in which the first rotation shaft is formed and a direction in which the narrow surface part is formed are formed to be the same as each other.

9. The air flap of claim 1, wherein the air flap is formed in a shape in which a pair of unit assemblies each including the first door, the second door, and the housing are disposed in parallel in the left and right direction.

10. The air flap of claim 9, wherein the pair of the unit assemblies are formed in a symmetrical shape in the left and right direction.

11. The air flap of claim 9, wherein driving parts driven so that the first door and the second door are opened and closed are formed at left and right ends and are connected to the first door and the second door, and
opposite sides to the driving parts of the first door and the second door are coupled to the housing by rotatable coupling holes.

* * * * *